April 18, 1950 W. DE BOER ET AL 2,504,503
OPTICAL PROJECTION COMPARISON DEVICE
Filed Feb. 10, 1949 2 Sheets-Sheet 1
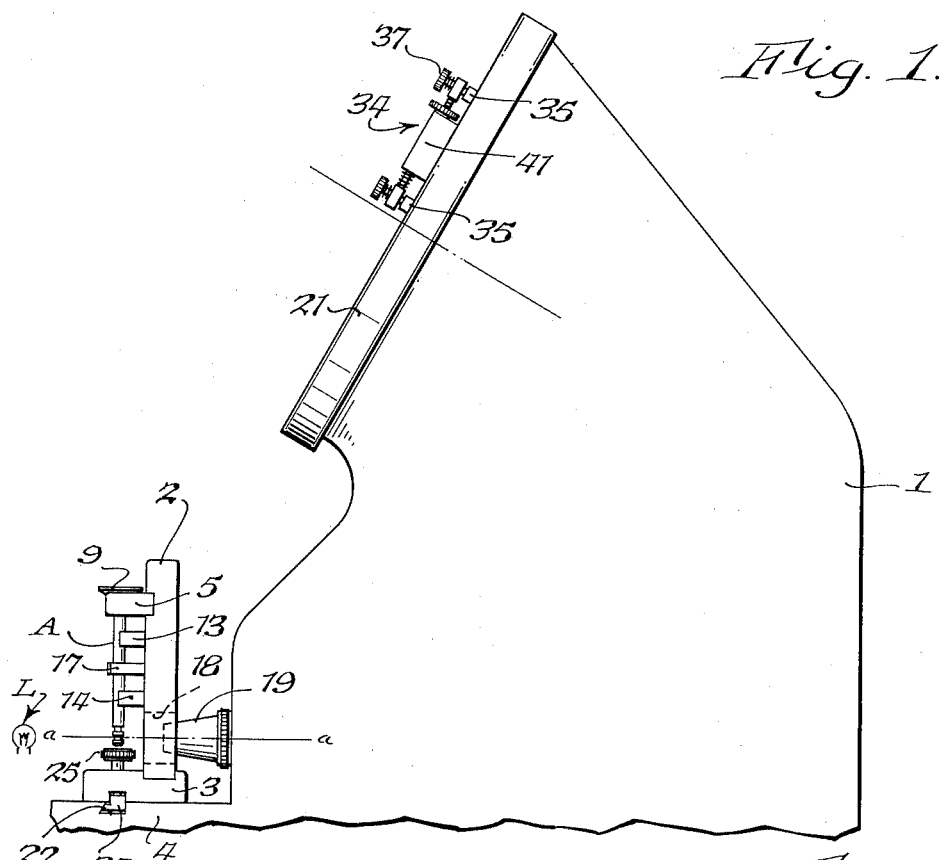
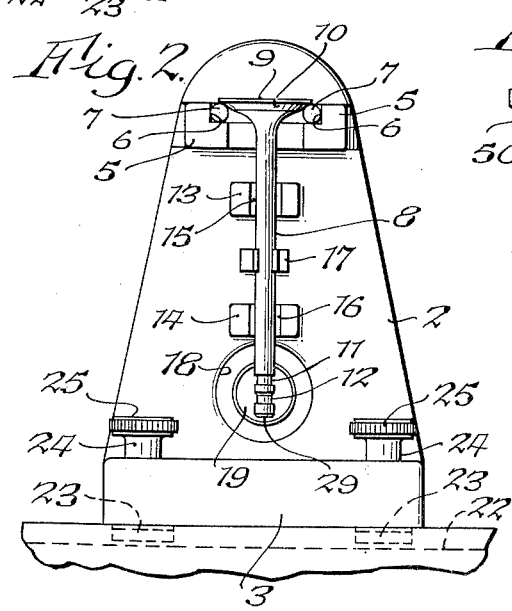
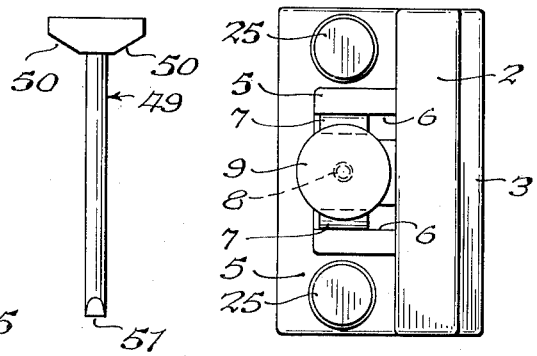

April 18, 1950     W. DE BOER ET AL     2,504,503
OPTICAL PROJECTION COMPARISON DEVICE Filed Feb. 10, 1949     2 Sheets-Sheet 2

Patented Apr. 18, 1950

2,504,503

UNITED STATES PATENT OFFICE 2,504,503

OPTICAL PROJECTION COMPARISON DEVICE

Willis De Boer, Williamsville, Gilbert A. Betts, Eggertsville, and Edward C. Polidor, Rochester, N. Y., assignors to Precision Methods Co., Inc., Buffalo, N. Y., a partnership Application February 10, 1949, Serial No. 75,512

6 Claims. (Cl. 88—24)

This invention relates to optical projection apparatus and particularly to comparing devices by which a magnified image of a part, accurately machined, may be judged for accuracy by reference to a similarly enlarged chart. Devices of this type are in common use and are described, for example, in co-pending De Boer et al. application, Serial No. 656,596 filed March 23, 1946, now U. S. Patent #2,451,155. dated October 12, 1948.

An object of this invention is to provide an improved optical comparing device in which a shadow image of an object may be optically projected on a magnified scale upon a viewing screen, for comparison therewith a chart on the screen representing, on that magnified scale, the proper size of the object, with the limits of permissible tolerance, and with which the distance from one selected part of the object to another part may be checked for accuracy notwithstanding that either or both of these parts may vary within permissible limits.

Another object of this invention is to provide an improved attachment for the viewing screen of an optical comparing device, by which the accuracy of dimensions between any selected parts may be accurately and quickly determined, even though one of the parts used as a reference may vary within permissible tolerances from some other part.

Another object of the invention is to provide improved means for mounting an object across the projection beam of an optical comparing device by which the object may be quickly and easily positioned and removed, and when positioned will always assume a fixed relation to a machined surface, on the mounting, and by which the mounting may be shifted in a plane crosswise of the projecting beam of light and located accurately across the light beam.

Another object is to provide an improved apparatus for accomplishing each and all of the foregoing objects, which will be relatively simple, compact, convenient, practical and inexpensive.

Other objects and advantages will be apparent from the following description of one embodiment of the invention, and the novel features will be particularly pointed out hereinafter in connection with the appended claims.

In the accompanying drawing:

Fig. 1 is a side elevation of part of a conventional, optical comparing device embodying this invention;

Fig. 2 is a front elevation of the mounting of the object to be compared, in its position across the optical axis of the projecting light beam;

Fig. 3 is a plan of the same;

Fig. 4 is an elevation of a master object used for setting up the holder in proper position across the light beam;

Fig. 5 is an elevation, on a larger scale, of the viewing screen having attached thereto an auxiliary measuring device constructed in accordance with this invention;

Fig. 6 is a side elevation of the auxiliary measuring device; and

Fig. 7 is a bottom end plan of the same.

In the illustrated embodiment of the invention, the comparing device includes a housing 1 into which a beam of light is directed from a suitable source of light L along an optical axis a—a (see Fig. 1). The object A to be checked, which in the example is in the nature of a valve for an internal combustion engine, is detachably mounted in a holder 2 carried on a base 3, which is mounted for adjustment on a shelf or carriage 4 of the comparing device, that may be adjusted vertically and horizontally across the light beam, as is usual in optical comparing devices. The holder 2 carries, adjacent to its upper end, a laterally extending member 5 (Fig. 3) having spaced grooves or rabbets 6 facing one another to form shelves, on each of which is supported a cylindrical rod 7. These rods 7 are accurately machined cylinders and may be secured against displacement on the shelves 6.

A poppet valve 8 has its head 9 disposed across and bridging the space between the rods 7, and with the shank of the valve depending from the head 9 between the rods 7, and between the laterally extending parts 5. The ground seat 10 on the under face of the head or flange 9 of the valve 8, rests upon the accurately machined rods 7, and thereby will always be accurately positioned on the rods in the same manner for each successive valve. The lower end of this valve 8 is provided with spaced, annular grooves 11 and 12 which are accurately machined and positioned relatively to the seat 10. On the front upstanding face of the holder 2 are vertically spaced V blocks 13 and 14, and V grooves 15 and 16 respectively are formed in such blocks to receive and position the shank of the valve 8 when the valve seat 10 is resting on the rods 7, and the shank of the valve is normally depending therefrom. A spring holder 17 in the nature of a U-shaped spring clip has opposed concave seats in its arms which may be sprung apart to receive and detachably hold the shank of the valve in its position against the grooves of the V block.

The upstanding wall of the holder 2 is provided with a passage 18 extending from face to face in horizontal alignment with the lower end portion of the valve 8, having annular grooves 11 and 12. A lens system 19 forming part of the optical system projection system is disposed on the housing 1 in the optical axis a—a, and the axis of the passage 18 is approximately coincident with the axis a—a. The light from the source L passing along the axis a—a will cast a shadow of the lower end of the shaft 8, and this shadow by means of the lens system 19 and the usual optical devices within the housing 1 will magnify that shadow and cast it upon a ground glass or other light transmitting, viewing screw 20 (Fig. 5) which is confined to the housing within a ring 21 (Fig. 1).

The shelf or carriage 4 is provided with a dovetail groove 22 in its upper face beneath the base 3, and a runner or clamping block 23 within the groove 22 is rotatably mounted on the lower end of a shaft 24 having a knurled periphery 25. The shaft 24 has its shank threaded in the block 23 so that by turning the shaft 24, the block 23 may be clamped against the beveled wall of the groove 22, so as to lock the base against movement or to release it, depending on the direction of rotation of the shaft 24. Two of such blocks 23 and shaft 24 are preferably provided on the base 3. This makes it possible to clamp the base 3 and holder 2 in any position along the shelf 4, or to release it for movement along the groove 22 into a different position in which it is to be clamped. Thus the holder 2 may be shifted horizontally in a direction crosswise of the beam of light or axis a—a until the lower end of the valve 8 is properly centered at the axis a—a.

The shadow of the lower end of the valve, as it is cast on the screen 20, is illustrated by the outer margin of the oblique shaded lines 26 (Fig. 5). The screen is provided with reference lines 27 and 28 at the lower part thereof, and if the valve 8 is properly machined, the shadow of the lower end wall 29 of the valve 8 should fall between reference lines 27 and 28 on the screen 20. In other words, the lines 27 and 28 represent the maximum and minimum permissible differences in the length of the valve stem from the seat 10. If the lower end of the shadow 26 falls between the lines 27 and 28, one knows at a glance that the length of the valve is accurate within permissible variations.

The screen 20 is also provided with spaced reference lines 30 and 31 (Fig. 5) which represent the maximum permissible variations in the position of the lower side wall of the groove 12 in the lower end of the valve stem. The corresponding shoulder in the shadow 26 should fall between the reference lines 30 and 31, otherwise the object is not within the permissible tolerances. Screen 20 is also provided with reference lines 32 and 33 which represent the maximum and minimum permissible variations in the bottom of the groove 12, and the portion of the shadow representing the bottom of the groove 12 must fall between the reference lines 32 and 33 if the part is to be acceptable. Similar reference lines could also be provided for the groove 11 but in this particular example, it is extremely important that the valve have very accurate dimensions between the lower side wall of groove 12 and the lower side wall of groove 11.

Since the lower side of the groove 12 may vary between the tolerance lines 30 and 31, the distance from that side wall of the groove 12 to the corresponding side wall of groove 11 should be measured from the actual lower side wall of the groove 12 instead of the reference lines representing maximum and minimum variations. Therefore, provision is made for measuring the actual distance from the lower side of groove 12 to the lower side wall of groove 11. The auxiliary device for measuring this is illustrated particularly in Figs. 5, 6 and 7.

This auxiliary measuring device is designated generally as 34 (see Figs. 5 to 7) and includes a pair of rubber suction cups 35 and 36 which are vertically spaced on the screen 20, and held thereon by the suction of the cups. Each cup has an upstanding relatively rigid post or stem 37 and sliding on each post is a member 38 (Fig. 6). A rod 39 is hinged at its ends by pins 38a to members 38 which it connects. One end of rod 39 is threaded. A knurled nut 40 is threaded on rod 39 over the threads thereof, and bears endwise against a sleeve 41 that slides freely on the rod 39. A helical compression spring 42 is connected between the other end of sleeve 41 and the adjacent member 38. When the nut 40 is turned in one direction it travels along the rod 39, forces the sleeve endwise (downward in Fig. 5) and compresses the spring 42. When the nut 40 is turned in the opposite direction, it moves away from the sleeve 41, and the spring 42 moves the sleeve in the opposite direction (upwardly in Fig. 5) to keep it in contact with the nut. A flat arm 43 extends laterally from the sleeve 41, parallel to the face of the screen 20, and at its free edge is slotted or rabbetted to receive and hold a plate 44 of glass or other suitable transparent material.

The plate 44 is disposed in close proximity to the outer face of the screen 20, and carries reference lines 45, 46, and 47. A helical spring 48 surrounds each post 37 and acts between a head 37a at its under face and the member 38 on that post 37. The springs 48 urge the members 38 and connecting rod 39 downwardly towards screen 20 so as to keep 44 in contact with a face of screen 20.

In use, after the shadow of the lower end of the valve is cast upon the screen 20, and one has found by comparison of the shadow 26 with the reference lines 27, 28 and 30 to 33 inclusive, that the lower end of the valve is accurate within specified limits, one turns the nut 40 so as to shift the plate 44 endwise along the shadow until the reference line 45 on plate 44 is aligned or coincides with the portion of the shadow corresponding to the lower side wall of the groove 12. One then ascertains whether or not the portion of the shadow representing or corresponding to the lower side wall of the groove 11 falls between lines 46 of plate 44. If the shadow does so fall, then the actual distance between the lower side walls of the grooves 11 and 12 is accurate within permissible tolerances.

This determination of the distance between the lower side walls of the grooves 11 and 12 is accurate, even though the lower side wall of groove 12 may vary along the stem of the valve within permissible tolerances. Similarly the reference lines 47, by comparison with the upper side wall of the groove 12, indicate whether the vertical width of the groove 12 is accurate within the permissible tolerances indicated by the reference lines 47. Additional reference lines 48a are also provided on the outer face of the screen 20. If an end edge of the shadow of groove 11 falls between lines 48a one knows that the distances between grooves 11 and 12, and between the shoulder 45 and the nearest end of groove 11 are accurate within permissible tolerances.

In setting up the holder 2 for a particular valve, one may, if desired, employ a master element 49, shown in Fig. 4, in place of the valve 8. The element 49 is T-shaped, with beveled lower edges 50 of the head corresponding in bevel, inclination and position to the shape of seat 10. The lower edge 51 of the shank of element 49 has a distance from the beveled edges 50 such that when the edges 50 rest on the rods 7, the lower edge 51 will cast a shadow on the viewing screen that will fall along some reference line, such as line 45 marked "Set" Fig.5). One shifts the shelf or carriage 4 vertically as usual in comparing devices, until the shadow of the lower edge 51 is coincident with the marking "Set." When that happens, the element 49 may be removed and then the valves 8 in succession may be mounted in the holder 2 and the dimensions thereof checked through comparison of the shadow of the lower end with the reference lines on the viewing screen.

It is believed that the use of the device will be obvious from the foregoing description and will not be repeated.

It will be understood that various changes in the details, materials and arrangements of parts, which have been herein described and illustrated in order to explain the nature of the invention, may be made by those skilled in the art, within the principle and scope of the invention as expressed in the appended claims.

We claim:

1. In an optical comparison system of the type in which a part of an object whose accuracy is to be checked is disposed in a beam of light and a shadow of that part of the object optically projected on a magnified scale upon a viewing screen for comparison with a chart on the screen, that improvement in said viewing screen which comprises a relatively stationary light transmitting screen on which said magnified shadow is cast, and having tolerance lines carried on a face thereof for visually indicating by the position of the shadow relatively thereto whether or not selected portions of said part are accurate within selected tolerances, a transparent plate disposed approximately flat against said screen face and carrying a reference line and auxiliary tolerance lines spaced from said reference line and representing permissible variations in the measurement of the shadow from said reference line to a special part of the shadow where great accuracy is required, a support fixed relatively to said screen and adjustably mounting said plate for selected movement in a direction across the face of said screen to place the reference line in alignment with a selected part of the shadow on the screen, whereupon the auxiliary tolerance lines will visually indicate, by the position of the shadow relatively thereto, whether a selected edge of the object is between permissible limits from a reference part of the object.

2. In an optical comparison system of the type in which a part of an object whose accuracy is to be checked is disposed in a beam of light and a shadow of that part of the object optically projected on a magnified scale upon a viewing screen for comparison with a chart on the screen, that improvement in said viewing screen which comprises a light transmitting screen on which said magnified shadow is cast, and having tolerance lines on the face thereof for visually indicating by the position of the shadow relatively thereto whether or not selected portions of said part are accurate within selected tolerances, a transparent plate disposed approximately against said screen face and carrying a reference line and auxiliary tolerance lines spaced from said reference line and representing permissible variations in the measurement of the shadow from said reference line to a special part of the shadow where great accuracy is required, suction cups secured to said screen, a screw device supported by said cups and mounting said plate for movement back and forth parallel to said screen, to place the reference line in alignment with a selected part of the shadow on said screen, whereupon the auxiliary tolerance lines will visually indicate, by the position of the shadow relatively thereto, whether a selected edge of the object is between permissible limits from a reference part of said object.

3. In an optical comparison system of the type in which a part of an object whose accuracy is to be checked is disposed in a beam of light and a shadow of that part of the object optically projected on a magnified scale upon a viewing screen for comparison with a chart on the screen, that improvement in said viewing screen which comprises a light transmitting screen on which said magnified shadow is cast, and having tolerance lines on a face thereof for visually indicating by the position of the shadow relatively thereto whether or not selected portions of said part are accurate within selected tolerances, a transparent plate disposed approximately against said screen face and carrying a reference line and auxiliary tolerance lines spaced from said reference line and representing permissible variations in the measurement of the shadow from said reference line to a special part of the shadow where great accuracy is required, suction cups secured to said screen, a threaded rod extending between said cups and supported thereby, a nut threaded on said rod, a carriage sliding on said rod and abutting at one end against said nut, a spring acting between the opposite end of said carriage and one of said cups for resiliently urging said carriage against said nut, said carriage mounting said plate for movement back and forth parallel to said screen, to place the reference line in alignment with a selected part of the shadow on said screen, whereupon the auxiliary tolerance lines will visually indicate, by the position of the shadow relatively thereto, whether a selected edge of the object is between permissible limits from a reference part of said object.

4. In an optical comparison system of the type in which a part of an object whose accuracy is to be checked is disposed in a beam of light and a shadow of that part of the object optically projected on a magnified scale upon a viewing screen for comparison with a chart on the screen, an improved accessory therefor which comprises a pair of suction cups for attachment to a face of said screen, a threaded rod extending between and supported by said cups, a carriage sliding on said rod and supported thereby, a nut threaded on said rod and abutting one end of said carriage, a spring acting between the other end of said carriage and one of said cups for resiliently and yieldingly urging said carriage against said nut, a transparent plate mounted on said carriage in close proximity to said screen for movement therewith back and forth parallel to said screen, said plate having a reference line and at a distance therefrom a pair of spaced auxiliary tolerance lines representing permissible variations in the measurement of the shadow from said reference line to a special part of the shadow where great accuracy is required, whereby when said carriage is shifted to place the reference line in alignment with a selected part of the shadow on said screen, the auxiliary tolerance lines will visually indicate, by the position of the shadow relatively thereto, whether a selected edge of the object is between permissible limits from a reference part of said object.

5. In an optical comparison system of the type in which a part of an object whose accuracy is to be checked is disposed in a beam of light and a shadow of that part of the object optically projected on a magnified scale upon a viewing screen for comparison with a chart on the screen, that improvement in the mounting of said object in the nature of a valve having a stem for an internal combustion engine which comprises a mounting element, a pair of spaced rods on said element on which diametrically opposite sides of the seat of said valve may rest with the stem of the valve depending, vertically spaced and horizontally opening V-blocks receiving and positioning the stem of said valve, a horizontally opening spring clip also receiving and yieldingly holding said stem against removal from said V-blocks, with a selected part of said stem across the optical axis of the beam of light, and means for adjusting said element in directions crosswise of said beam of light where it is incident on said selected part of said stem.

6. In an optical comparison system of the type in which a part of an object whose accuracy is to be checked is disposed in a beam of light and a shadow of that part of the object optically projected on a magnified scale upon a viewing screen for comparison with a chart on the screen, that improvement in the mounting of said object in the nature of a valve having a stem for an internal combustion engine, which comprises a mounting element, a pair of spaced rods on said element on which diametrically opposite sides of the seat of said valve may rest with the stem of the valve depending, vertically spaced and horizontally opening V-blocks receiving and positioning the stem of said valve, a horizontally opening spring clip also receiving and yieldingly holding said stem against removal from said V-blocks, with a selected part of said stem across the optical axis of the beam of light, means for adjusting said element in directions crosswise of said beam of light where it is incident on said selected part of said stem, and a master member also mountable in said V-blocks and spring clip, with accurately machined shoulders resting on said rods and a lower edge accurately formed to cast a shadow that may be caused to register with a reference line on said chart by manipulation of said adjusting means, and thereby properly position said rods and V-blocks relatively to said light beam incident thereon.

WILLIS DE BOER.
GILBERT A. BETTS.
EDWARD C. POLIDOR.

REFERENCES CITED

The following references are of record in the file of this patent:

UNITED STATES PATENTS

| Number | Name | Date |
|---|---|---|
| 2,192,529 | Thomas et al. | Mar. 5, 1940 |
| 2,381,634 | Back | Aug. 7, 1945 |
| 2,400,501 | Gilbert | May 21, 1946 |
| 2,422,611 | Becker et al. | June 17, 1947 |
| 2,451,155 | DeBoer et al. | Oct. 12, 1948 |